United States Patent
Woo et al.

(10) Patent No.: US 10,373,357 B2
(45) Date of Patent: Aug. 6, 2019

(54) DEVICE AND METHOD FOR DISPLAYING SCREEN BASED ON EVENT

(71) Applicant: SAMSUNG ELECTRONICS CO., LTD., Suwon-si (KR)

(72) Inventors: Jooyeon Woo, Hwaseong-si (KR); Hongpyo Kim, Seoul (KR); EricHyunsurk Ryu, Hwaseong-si (KR); Jun Haeng Lee, Hwaseong-si (KR); Kyoobin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 14/818,659

(22) Filed: Aug. 5, 2015

(65) Prior Publication Data

US 2016/0300374 A1 Oct. 13, 2016

(30) Foreign Application Priority Data

Apr. 10, 2015 (KR) .................. 10-2015-0051102

(51) Int. Cl.
| | |
|---|---|
| *G06F 3/01* | (2006.01) |
| *G06T 13/80* | (2011.01) |
| *G06T 11/60* | (2006.01) |
| *G06F 3/042* | (2006.01) |

(52) U.S. Cl.
CPC ............. *G06T 11/60* (2013.01); *G06F 3/011* (2013.01); *G06F 3/017* (2013.01); *G06F 3/042* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 9,563,981 B2 * | 2/2017 | Fujiwara | ................ G06T 11/60 |
| 9,875,562 B2 * | 1/2018 | Hayasaka | ............... G06T 11/60 |
| 2011/0007073 A1 | 1/2011 | Belt et al. | |
| 2012/0051588 A1 | 3/2012 | McEldowney | |
| 2013/0120445 A1 | 5/2013 | Shimomura et al. | |
| 2013/0329952 A1 | 12/2013 | Lee et al. | |
| 2013/0335595 A1 * | 12/2013 | Lee | .................... H04N 5/23229 348/231.5 |
| 2014/0118259 A1 | 5/2014 | Paek et al. | |
| 2015/0185824 A1 * | 7/2015 | Mori | ......................... G06F 3/01 345/156 |

FOREIGN PATENT DOCUMENTS

| | | |
|---|---|---|
| EP | 2767889 A1 | 8/2014 |
| JP | 2013-120498 A | 6/2013 |
| KR | 10-2008-0079459 A | 9/2008 |
| KR | 10-2011-0111662 A | 10/2011 |
| KR | 10-2012-0091987 A | 8/2012 |
| KR | 10-1414362 B1 | 7/2014 |
| KR | 10-2014-0140273 A | 12/2014 |

OTHER PUBLICATIONS

Communication dated Sep. 1, 2016, from the European Patent Office in counterpart European Application No. 16163125.4.

* cited by examiner

*Primary Examiner* — Peter Hoang
(74) *Attorney, Agent, or Firm* — Sughrue Mion, PLLC

(57) ABSTRACT

A device and method to display a screen based on an event are provided. A device according to an exemplary embodiment may display, in response to an event associated with a movement of an object, a graphic representation that corresponds to the event by overlaying the graphic representation on visual contents.

20 Claims, 18 Drawing Sheets

DEVICE AND METHOD FOR DISPLAYING SCREEN BASED ON EVENT

CROSS-REFERENCE TO RELATED APPLICATION

This application claims priority from Korean Patent Application No. 10-2015-0051102, filed on Apr. 10, 2015 in the Korean Intellectual Property Office, the disclosure of which is incorporated herein by reference in its entirety.

BACKGROUND

1. Field

Methods and apparatuses consistent with exemplary embodiments relate to a device and method for displaying a screen based on an event.

2. Description of the Related Art

Electronic devices in various types have been developed and provided in response to developments in electronic technology. Recently, sizes of the electronic devices are minimized and functions are more varied, thereby increasing a demand for the electronic devices.

In response to the varied functions provided from the electronic devices, various needs for a method of displaying contents and a method of a user interaction are growing. In such interactions between users and the electronic devices, a feedback is required to be provided for a user. The feedback may provide, for a user, information that relates to whether a predetermined task succeeds or fails when a user performs the task and information associated with a current or a future condition. The feedback may be provided in a form of a visual change and/or a sound effect for the user.

SUMMARY

Exemplary embodiments may address at least the above problems and/or disadvantages and other disadvantages not described above. Further, the exemplary embodiments are not required to overcome the disadvantages described above, and an exemplary embodiment may not overcome any of the problems described above.

According to an aspect of an exemplary embodiment, there is provided a device for displaying a screen based on an event, the device including an event sensor configured to detect respective events generated for each of a plurality of sensing elements and to output a corresponding plurality of event signals, a processor configured to generate, in response to the output of the plurality of event signals, a graphic representation that corresponds to an event signal from among the plurality of event signals that relates to a movement of an object, and a display configured to display the generated graphic representation.

The display may be further configured to display visual contents and to display the graphic representation by overlaying the graphic representation on the visual contents.

The processor may be further configured to estimate, in response to the output of the plurality of event signals, a location of the object, and to change, in response to the movement of the object, at least one from among the visual contents and acoustic contents provided with the visual contents.

The processor may be further configured to execute, in response to a distance between the object and the device being determined to be less than or equal to a predetermined threshold distance, a predetermined operation.

The display may be further configured to display, in response to a distance between at least a portion of the object and the device being determined to be less than or equal to a predetermined threshold distance, the event signal that relates to the movement of the object.

The processor may be further configured to determine at least one from among a size of the graphic representation, a location of the graphic representation on the display, a color of at least a portion of the graphic representation, a pattern of a graphic primitive included in the graphic representation, a valid time interval during which the graphic representation is displayed, and an animation effect applied to the graphic representation.

The processor may be further configured to determine, based on an input received from a user, at least one of the size of the graphic representation, the location of the graphic representation on the display, the color of at least a portion of the graphic representation, the pattern of the graphic primitive included in the graphic representation, the valid time interval during which the graphic representation is displayed, and the animation effect applied to the graphic representation.

The display may be further configured to asynchronously display, in response to the output of the event signal that relates to the movement of the object, a graphic primitive that corresponds to the event signal that relates to the movement of the object.

The processor may be further configured to accumulate the event signal that relates to the movement of the object during a predetermined time interval and to generate a cumulative graphic representation based on the accumulating.

The display may be configured to terminate the displaying of the graphic representation in response to at least one from among a determination that a motion of an object recognized from the output of the plurality of event signals corresponds to a predetermined motion, a reception of a predetermined manipulation, a determination that the object is not in a predetermined space, a determination that the object is not in a sensing space, and a determination that a distance between the object and the device exceeds a threshold distance.

The processor may be further configured to generate, in response to an output of an event signal during a valid time interval with respect to a time of an earliest output of an event signal from among the plurality of event signals, a graphic representation that corresponds to the event signal output during the valid time interval, and to exclude an event signal output after the valid time interval.

The processor may be further configured to identify, in response to the output of the plurality of event signals, a shape of at least a portion of the object, and the display may be further configured to display an event signal that corresponds to the identified shape as the graphic representation.

The processor may be further configured to identify, in response to the output of the plurality of event signals, at least one shape of at least a portion of the object, and when the at least one shapes includes a plurality of shapes, the display may be further configured to display at least a first shape from among the plurality of shapes as a graphic representation that differs from a graphic representation that corresponds to a second shape from among the plurality of shapes.

The processor may be further configured to identify, in response to the output of the plurality of event signals, an attribute and a shape of at least a portion of the object, and the display may be further configured to display an event signal that corresponds to the identified shape as a graphic representation determined based on the identified attribute.

The processor may be further configured to estimate, in response to the output of the plurality of the event signals, a distance from the device to the object and a location of the object with respect to the device, and to provide, in response to a determination of the location of the object after a predetermined gaze time within a predetermined space, an interaction with a user that corresponds to the object.

The processor may be further configured to recognize, in response to the output of the plurality of event signals, a motion of the object, to determine an intensity of the recognized motion, and to perform at least one operation that corresponds to the recognized motion and the intensity.

The processor may be further configured to determine, based on an address that corresponds to the event signal that relates to the movement of the object, a location within the display at which the graphic representation is displayed.

The processor may be further configured to estimate a distance from the device to the object and to change, in response to a change of location of the object, at least one of visual contents, acoustic contents provided with the visual contents, and the graphic representation.

According to another aspect of an exemplary embodiment, there is also provided a method for displaying a screen based on an event, the method including outputting a plurality of event signals by detecting respective events generated in each of a plurality of pixels included in image data, generating, in response to the outputting the plurality of event signals, a graphic representation that corresponds to an event signal from among the plurality of event signals that relates to a movement of an object, and displaying the generated graphic representation.

In yet another aspect, according to one or more exemplary embodiments, a display apparatus is provided. The display apparatus includes a sensor configured to detect a movement of at least a portion of an object and to generate a signal that corresponds to the detected movement; a processor configured to use the generated signal to generate a graphic representation of the object that corresponds to the detected movement; and a display configured to display the generated graphic representation.

The object may include a body of a person, and the at least a portion of the object may include at least one body part from among a head, a face, a hand, an arm, and a leg of the person. The sensor may be further configured to detect a first movement of a first body part and to detect a second movement of a second body part that is different from the first body part, and to generate a first signal that corresponds to the detected first movement and to generate a second signal that corresponds to the detected second movement. The processor may be further configured to use the first signal and the second signal to generate the graphic representation of the body of the person.

The display may be further configured to display at least one visual content in conjunction with the generated graphic representation. The processor may be further configured to cause the display of the at least one visual content to be varied based on the detected movement. The processor may also be further configured to use the generated signal to determine an estimated distance between the object and the display apparatus, and to cause the display of the at least one visual content to be varied based on the determined estimated distance.

In still another aspect, according to one or more exemplary embodiments, a method for displaying an object is provided. The method includes: detecting, by a sensor, a movement of at least a portion of an object; generating a signal that corresponds to the detected movement; generating, by a processor, a graphic representation of the object that corresponds to the detected movement; and displaying the generated graphic representation.

The object may be a body of a person, and the at least a portion of the object may include at least one body part from among a head, a face, a hand, an arm, and a leg of the person. The detecting may include detecting comprises detecting a first movement of a first body part and detecting a second movement of a second body part that is different from the first body part. The generating the signal may include generating a first signal that corresponds to the detected first movement and generating a second signal that corresponds to the detected second movement. The generating the graphic representation may include using the first signal and the second signal to generate the graphic representation of the body of the person.

The method may further include displaying at least one visual content in conjunction with the generated graphic representation, and varying the displaying of the at least one visual content based on the detected movement. The method may further include determining an estimated distance between the object and the sensor. The varying the displaying may further include varying the displaying of the at least one visual content based on the determined estimated distance.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
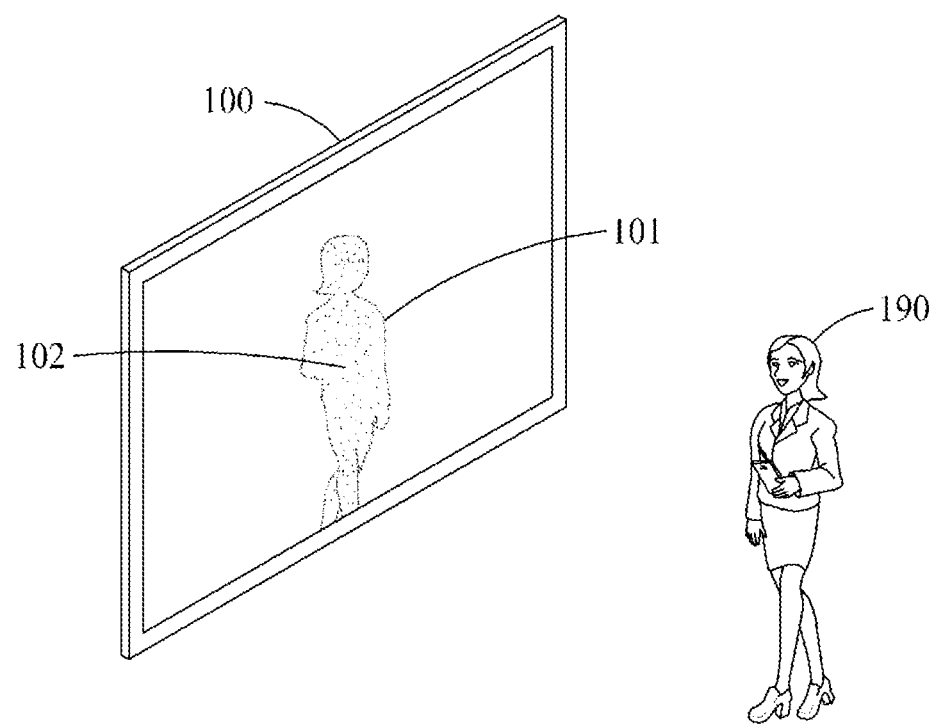
FIG. 1 is a diagram illustrating an example of displaying a graphic representation that corresponds to an event generated according to a movement of an object, according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be apparent to those of ordinary skill in the art. The progression of processing steps and/or operations described is an example; however, the sequence of and/or operations is not limited to that set forth herein, and may be changed as is known in the art, with the exception of steps and/or operations necessarily occurring in a particular order. In addition, respective descriptions of well-known functions and constructions may be omitted for increased clarity and conciseness.

In the present disclosure, an event may include, for example, an event in which an intensity of light is changed. For example, the event may be detected and output by an event-based vision sensor configured to capture an object.

The event-based vision sensor may time-asynchronously output an event signal in response to detecting a change in the intensity of incident light. For example, when a sensing element of the event-based vision sensor detects an event in which the intensity of light increases, the sensing element may output an ON event. Further, when the sensing element of the event-based vision sensor detects an event in which the intensity of light decreases, the sensing element may output an OFF event.

In contrast to a frame-based vision sensor, the event-based vision sensor may output an event signal via the sensing element that senses a change in the intensity of light in lieu of scanning a photodiode output from each pixel on a frame-by-frame basis. The change in the intensity of light may occur due to a movement of the object or a movement of the event-based vision sensor.

For example, when a light source is practically fixed with respect to an elapse of time, and when the object does not independently emit light, light incident to the event-based vision sensor may include light generated from the light source and reflected by the object. When the object, the light source, and the event-based vision sensor do not move, light reflected by the external object in a stationary state may not be changed in practice and thus, a change in the intensity of light incident to the event-based vision sensor may not occur. Conversely, when the object is moving, the light reflected by the moving object may change based on the movement of the object and thus, a change in the intensity of light incident to the event-based vision sensor may occur.

The event signal output in response to the movement of the object may include information that is time-asynchronously generated. In this example, the information may be similar to an optic nerve signal transferred from a retina to a brain. For example, the event signal may not be generated with respect to a stationary object, and may be generated in response to detecting a moving object.

As an example, when an intensity of light increases by at least a predetermined amount in a third sensing element, the event-based vision sensor may output a bit that indicates an ON event and an address of the third sensing element. As another example, when an intensity of light increases by at least a predetermined amount in a fourth sensing element, the event-based vision sensor may output a bit that indicates an OFF event and an address of the fourth sensing element. In this example, an address for each sensing element may be expressed by, for example, a number, a position, and an index.

The event-based vision sensor may also output a time at which the change in the intensity of light occurs. In this example, the event-based vision sensor may include a timer. A processor configured to process a signal output from the event-based vision sensor may receive information that corresponds to the time. In another example, the event-based vision sensor may not output a time at which the change in the intensity of light occurs. In this example, the processor may set a point in time at which an event signal is received as being equivalent to the time at which the change in the intensity of light occurs.

In contrast to the event-based vision sensor, an event-based acoustic sensor may detect a change in sound that is received by the sensor, and may output the detected change as an event. The event-based acoustic sensor may time-asynchronously output an event signal in response to detecting the change in the received sound. For example, when the event-based acoustic sensor detects an event in which an intensity of sound increases in a predetermined frequency band, the event-based acoustic sensor may output an ON event that corresponds to the frequency band. Further, when the event-based acoustic sensor detects an event in which the intensity of sound decreases in the predetermined frequency band, the event-based acoustic sensor may output an OFF event that corresponds to the frequency band.

In another example, an event-based touch sensor may detect a change in a touch that is sensed by the sensor, and may output the detected change as an event. The event-based touch sensor may time-asynchronously output an event signal in response to detecting the change in the sensed touch. For example, when the event-based touch sensor detects a touch input event in a predetermined location, the event-based touch sensor may output an ON event that corresponds to the predetermined location. Further, when the event-based touch sensor detects a touch release event in the predetermined location, the event-based touch sensor may output an OFF event that corresponds to the predetermined location.

Hereinafter, the event-based sensor and the event-based vision sensor may also be referred to as an event sensor in the present disclosure. Since the event sensor applies time information and an address of the sensing element in which the intensity of light changes, a quantity of processed information may be reduced as compared to a general image camera.

FIG. 1 is a diagram illustrating an example of displaying a graphic representation that corresponds to an event generated according to a movement of an object, according to an exemplary embodiment.

A device 100 for displaying a screen based on an event according to an exemplary embodiment displays a graphic representation 101 that corresponds to an object 190. For example, the device 100 for displaying the screen based on the event may detect an event generated according to a movement of an object, and may display the graphic representation 101 that corresponds to the generated event, as illustrated in FIG. 1.

For example, on the assumption that the object 190 of FIG. 1 is a human, when a movement of a human or a portion of a human body occurs, the device 100 may detect an event according to a movement by using an event sensor, and may display the graphic representation 101 that indicates a shape of the human or the portion of the human of which the movement occurs. However, the object 190 is not limited thereto. The object 190 may include all objects external to a device, for example, a human, an article, and an animal.

In the present disclosure, the graphic representation 101 may be a visual representation that corresponds to an event detected by the event sensor, and is displayed an electronic display. For example, the graphic representation 101 may include at least one graphic primitive 102, and the graphic primitive 102 may be a visual primitive that indicates a single event signal detected by a single sensing element of an event sensor. As illustrated in FIG. 1, the graphic representation 101 may be displayed by the device 100 in a set of the graphic primitive 102.

According to an exemplary embodiment, the graphic representation 101 that corresponds to an individual as feedback with respect to the individual may be provided. The individual may experience a new interaction via the graphic representation 101, which changes by instantly responding to a human activity, in a manner similar to a mirror. For example, feedback may be provided in a form of a visual change, a sound effect, or a combination thereof.

In lieu of using a general camera, when an event sensor is used to sense a movement of an individual, for example, the object 190 of FIG. 1, a privacy issue may not occur, because use of the graphic representation 101 is limited to merely a shape of an individual without other detailed attributes. Further, because each sensing element of the event sensor asynchronously outputs an event signal, each sensing element may constantly operate in a relatively low power state.

Figure 2:
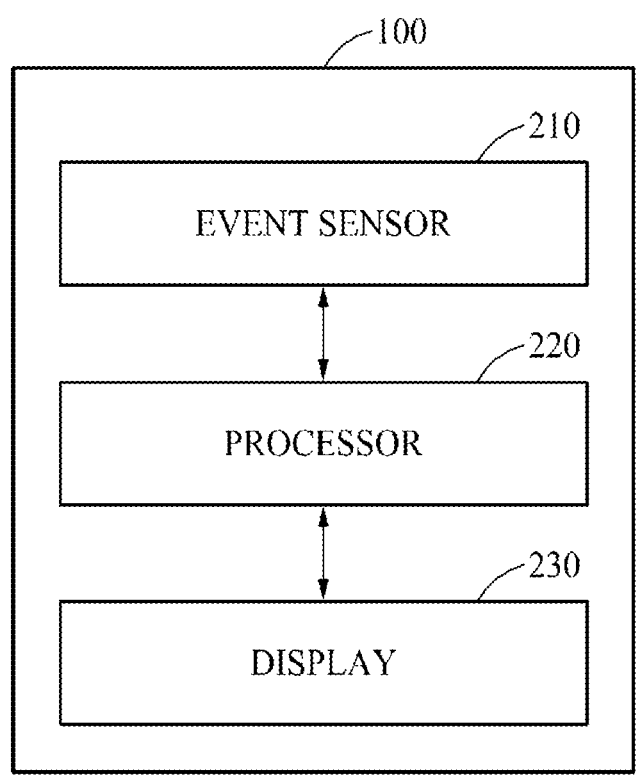
FIGS. 2 and 3 are block diagrams illustrating a device for displaying a screen based on an event, according to an exemplary embodiment.
Figure 3:
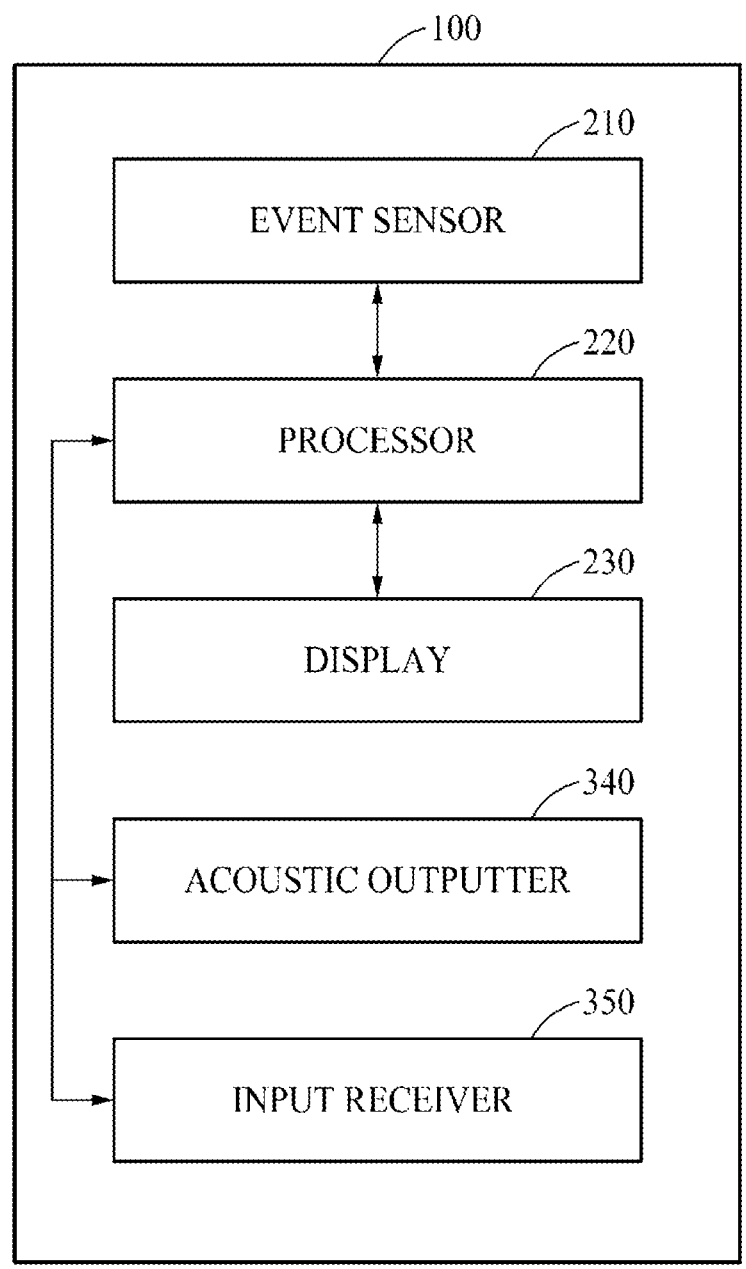

FIGS. 2 and 3 are block diagrams illustrating a device for displaying a screen based on an event, according to an exemplary embodiment.

As illustrated in FIG. 2, the device 100 for displaying the screen based on the event includes an event sensor 210, a processor 220, and a display 230.

The event sensor 210 detects respective events generated for each of a plurality of sensing elements and outputs a corresponding plurality of event signals. For example, as described above, the event sensor 210 may time-asynchronously output an event signal in response to a change in the intensity of incident light. The event sensor 210 may be operated through being embedded in the device 100 or peripherally.

Further, the event sensor 210 may output, from each sensing element, event signals generated when an object moves. Each of the event signals may include time information and an address of the sensing element in which an event is generated. According to an exemplary embodiment, when a frequency of the event signal output exceeds a threshold value, the processor 220 may analyze the event signal.

The processor 220 generates, in response to the output of the plurality of event signals, a graphic representation that corresponds to an event signal from among the plurality of event signals that relates to a movement of an object. The processor 220 may control the display 230 to display the generated graphic representation. For example, the processor 220 may determine whether a shape of a predetermined object or a person is to be displayed in the graphic representation when the shape of the predetermined object or the person is identified from the event signal. According to an exemplary embodiment, the processor 220 may determine, with respect to a predetermined body portion, such as, for example, a hand or a face of a person, whether an intensity and a duration time of the graphic representation is to be changed in order to consistently display the graphic representation. Further, when an object identified from the event signal is a predetermined person or a pre-defined object, a shape and an intensity of the feedback may be determined in various manners.

A detailed operation of the processor 220 will be provided hereinafter.

Under the control of the processor 220, the display 230, which is a module configured to display an image, may be implemented as an additional separate module or included in the device 100 for displaying the screen based on the event. For example, the display 230 may include any one or more of a screen, a projector, a liquid crystal display (LCD), and an organic light emitting diode (OLED). According to an exemplary embodiment, the display 230 may display contents and the graphic representation under the control of the processor 220. When a frame update value of a frame per second (FPS) of the display 230 increases, the graphic representation may be displayed more naturally. The device 100 according to an exemplary embodiment may be applied to a large screen and a small screen, for example, a large format display (LFD) that is intended for use in a public place, and a television (TV) that is intended for use in a residential space. The small screen, such as a mobile device and a tablet, may display only a graphic representation that corresponds to a face or a hand of a person.

In the present disclosure, the contents may be provided in various forms, for example, visual contents and acoustic contents. The visual contents may correspond to contents provided to an individual in a visual form, and the acoustic contents may correspond to contents provided to an individual in a form of a sound. For example, the contents may include any of a menu, a background, a guide, and a video.

Further, as illustrated in FIG. 3, the device 100 for displaying the screen based on the event may further include an acoustic outputter 340 and an input receiver 350.

The acoustic outputter 340 may be disposed in a vicinity of the device 100 or embedded in the device 100. In addition, the acoustic outputter 340 may be provided in a module that is configured to output a sound under the control of the processor 220. According to an exemplary embodiment, the acoustic outputter 340 may output the acoustic contents under the control of the processor 220.

The input receiver 350 may be disposed in a vicinity of the device 100 or embedded in the device 100. In addition, the input receiver 350 may be provided in a module that is configured to be manipulated by an individual. The input receiver 350 may be used in a form of a touch display combined with the display 230. The input receiver 350 may receive the manipulation from the individual, and the processor 220 may control the display 230 and the acoustic outputter 340 according to the received manipulation. For example, the processor 220 may perform an operation to cause the graphic representation to disappear when an individual selects main contents, and may control the display 230 to perform an operation to cause the graphic representation to appear as required, even when contents are in use.

The device 100 according to an exemplary embodiment may output, using the event sensor 210 which is asynchronous, the graphic representation in a form similar to a silhouette according to a real-time movement of an object on the display 230. The device 100 may provide an interactive service between an individual and an electronic device by providing a graphic representation that corresponds to an object projected to the display 230 as real-time feedback.

The device 100 according to an exemplary embodiment may induce, prior to control of the device 100 by an individual, an interest of the individual by displaying a graphic representation in a shape similar to a silhouette, via the display 230. Further, the device 100 may display, in real time, a graphic representation that corresponds to an individual, for example, a person, and a graphic representation of a moving object.

Figure 4:
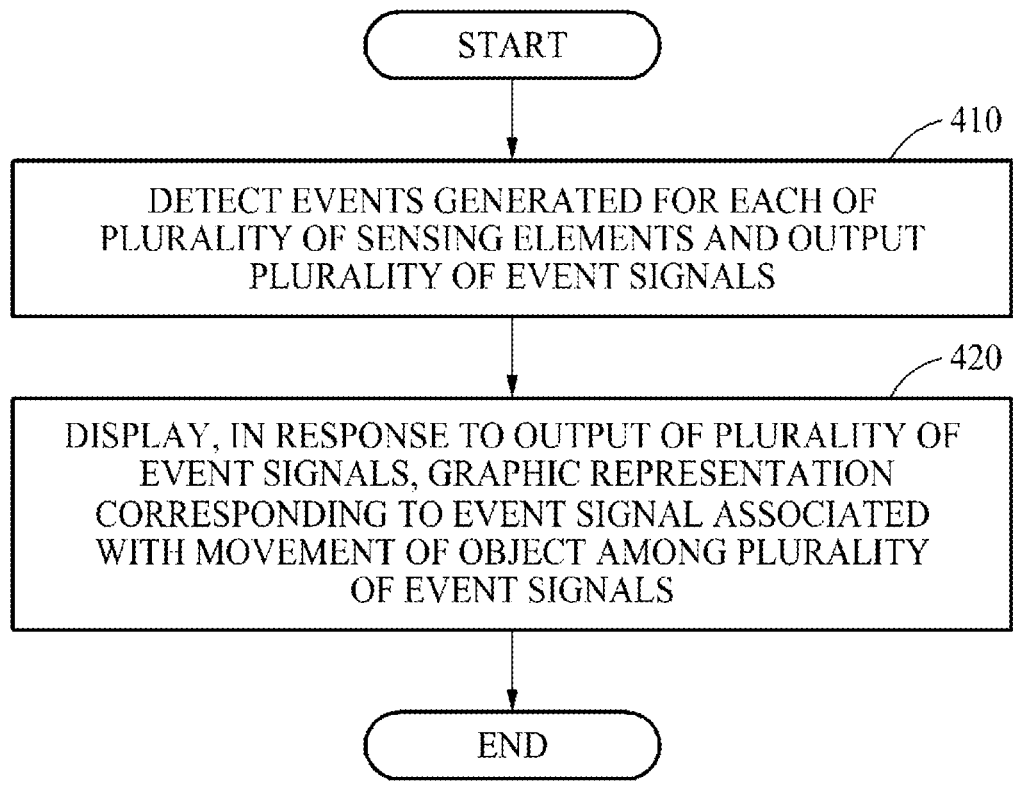
FIG. 4 is a flowchart illustrating a method for displaying a screen based on an event, according to an exemplary embodiment.

FIG. 4 is a flowchart illustrating a method for displaying a screen based on an event, according to an exemplary embodiment.

In operation 410, an event sensor detects respective events generated for each of a plurality of sensing elements and outputs a plurality of event signals.

In operation 420, a display, in response to the output of the plurality of event signals, displays a graphic representation corresponding to an event signal from among the plurality of event signals that is associated with a movement of an object. For example, in response to the output of the plurality of event signals in operation 420, a graphic representation that corresponds to an event signal associated with a movement of an object may be generated, and the display may display the generated graphic representation. The description of the displaying of the graphic representation will be provided below with reference to FIG. 6.

Figure 5:
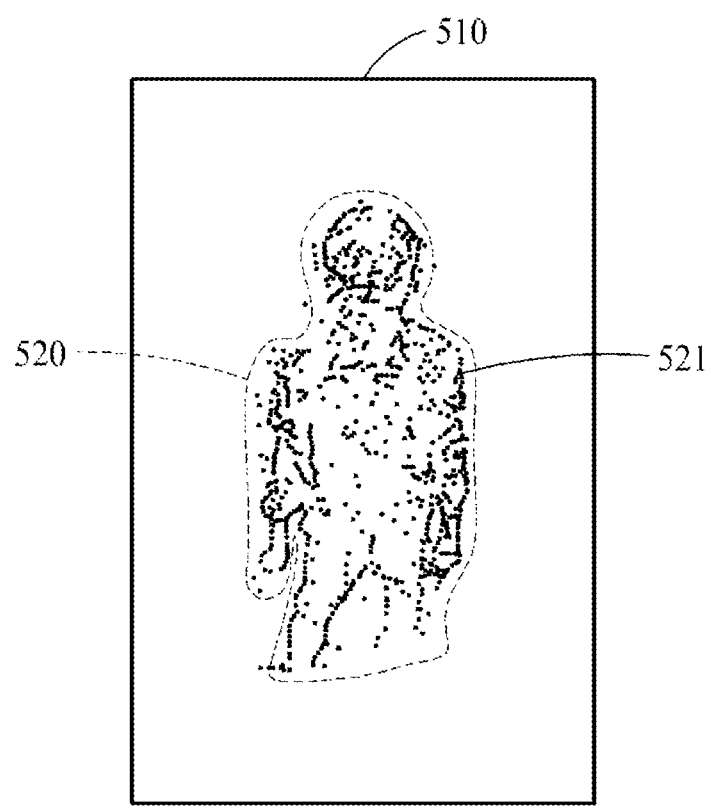
FIG. 5 is a diagram illustrating an example of a graphic representation displayed based on an event, according to an exemplary embodiment.

FIG. 5 is a diagram illustrating an example of a graphic representation 520 displayed based on an event, according to an exemplary embodiment.

A display may display a graphic representation 520 that corresponds to a movement of an object on a screen 510. Although background of the screen 510 of FIG. 5 is illustrated as a single-colored background, it is only an example. The background of the screen 510 may include any of a live background, an animated background, and a still image background. Further, although it is not illustrated in FIG. 5, the screen 510 may include a visual representation that differs from a graphic representation.

As illustrated in FIG. 5, the graphic representation 520 may be displayed in a set of graphic primitives 521. Although FIG. 5 illustrates that an entire silhouette of an object, for example, a person, is to be presented in the graphic representation 520, it is only an example. The graphic representation 520 may represent a portion of an object of which a movement is generated or an entirety of an object of which a movement is generated.

For example, the display asynchronously displays, in response to a respective event signal that relates to a movement of an object, the graphic primitive 521 that corresponds to each event signal that relates to the movement of the object. In this example, a processor may instantly generate each respective event signal as the corresponding graphic primitive 521 corresponding to each respective event signal.

In another example, the processor accumulates the event signal associated with the movement of the object during a predetermined time interval and generates the graphic representation 520 based on the accumulating. In this example, the processor may generate an event frame by accumulating the event signal generated during the predetermined time interval, and the display may display the event frame as the graphic representation 520.

The processor determines, based on an address that corresponds to the event signal that relates to the movement of the object, a location within the display at which the graphic representation 520 is displayed. For example, the processor may map an address of each sensing element at a location of a pixel on the display, and the display may display the graphic representation 520 that corresponds to an event signal at the location of the pixel that corresponds to the address of the sensing element of which the event signal is detected.

On a screen of which a display, for example, a TV, is turned off, the display may display the graphic representation 520, in lieu of displaying a black screen, when an individual appears or is located within a predetermined distance. Information that relates to the graphic representation 520, such as, for example, settings such as a color, a shape, a size and a valid time interval, may be changed in accordance with user settings of an option of the device such as a TV. The information that relates to the graphic representation 520, a method for moving a menu to subsequent contents, and a service that corresponds to an individual recognition may be simultaneously provided.

Figure 6:
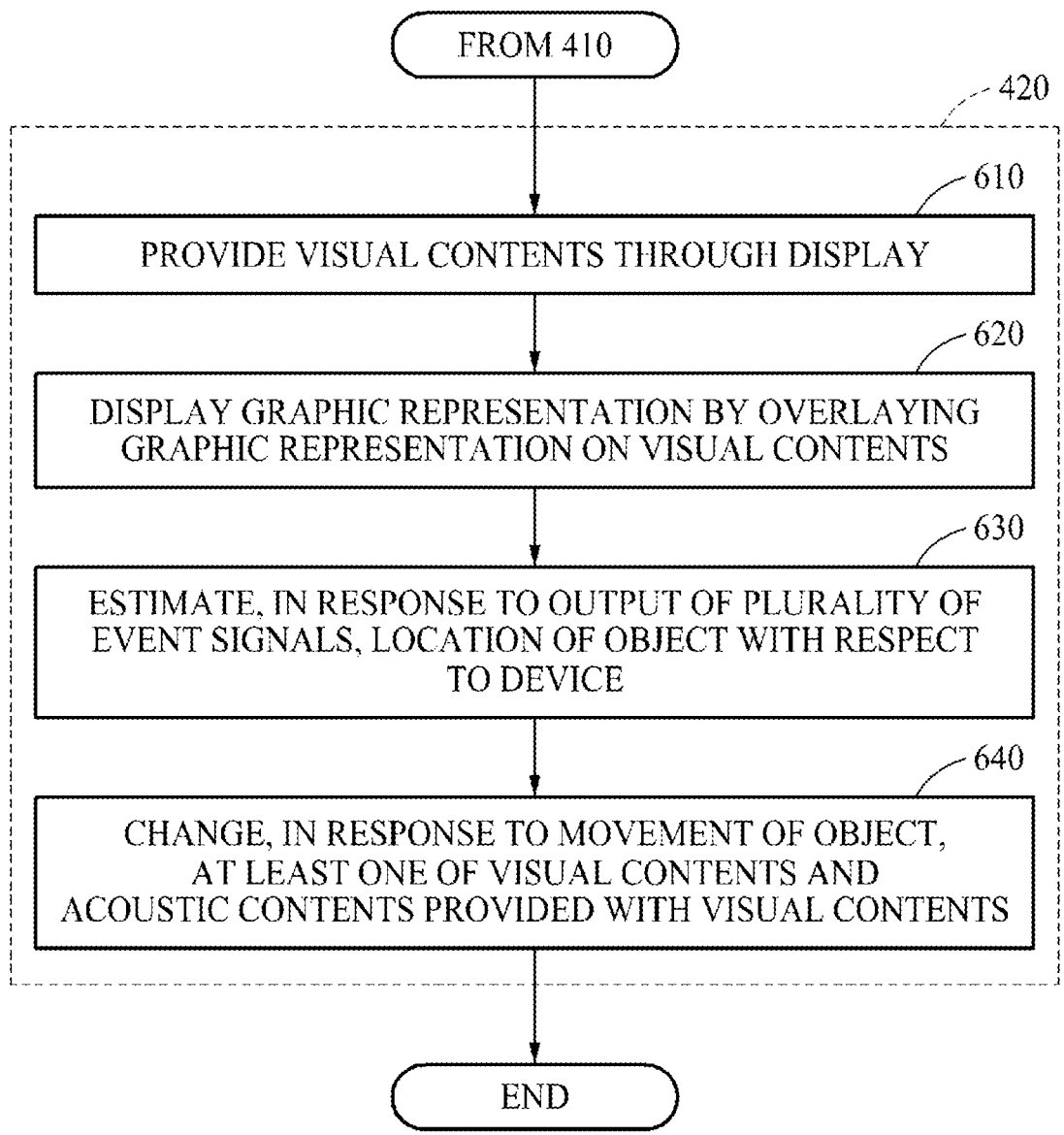
FIG. 6 is a flowchart illustrating a method for displaying a graphic representation that corresponds to an event signal associated with a movement of an object, according to an exemplary embodiment.

FIG. 6 is a flowchart illustrating a method for displaying a graphic representation that corresponds to an event signal that relates to a movement of an object, according to an exemplary embodiment.

The aforementioned operation 420 includes the following operations.

In operation 610, a display displays visual contents. For example, a display may display, under a control of a processor, visual contents that include, for example, any one of more of an advertisement, a video, a guide, and a menu. Irrespective of information that indicates whether an individual approaches a device, the display may display the visual contents.

In operation 620, the display displays a graphic representation in conjunction with the visual contents by overlaying the graphic representation on the visual contents. For example, a display may overlay, in response to an output of an event signal, a graphic representation that corresponds to the event signal in conjunction with visual contents displayed in operation 610. The processor may determine the graphic representation to be overlaid transparently, translucently, or opaquely with respect to the visual contents.

In operation 630, the processor estimates, in response to the output of a plurality of event signals, a location of the object with respect to the device. In the present disclosure, the location of the object with respect to the device may be referred to as a relative planar location based on the device. A detailed description of the location of the object with respect to the device will be provided below with reference to FIG. 7. For example, a processor may estimate a location of an object based on an address of a sensing element that corresponds to an event signal output by an event sensor.

In operation 640, the processor changes, in response to the movement of the object, at least one of the visual contents and acoustic contents that correspond to the visual contents. For example, the processor may change at least one of visual contents and acoustic contents when a location of an object is changed. A detailed description thereof will be provided below with reference to FIGS. 10 and 11.

Figure 7:
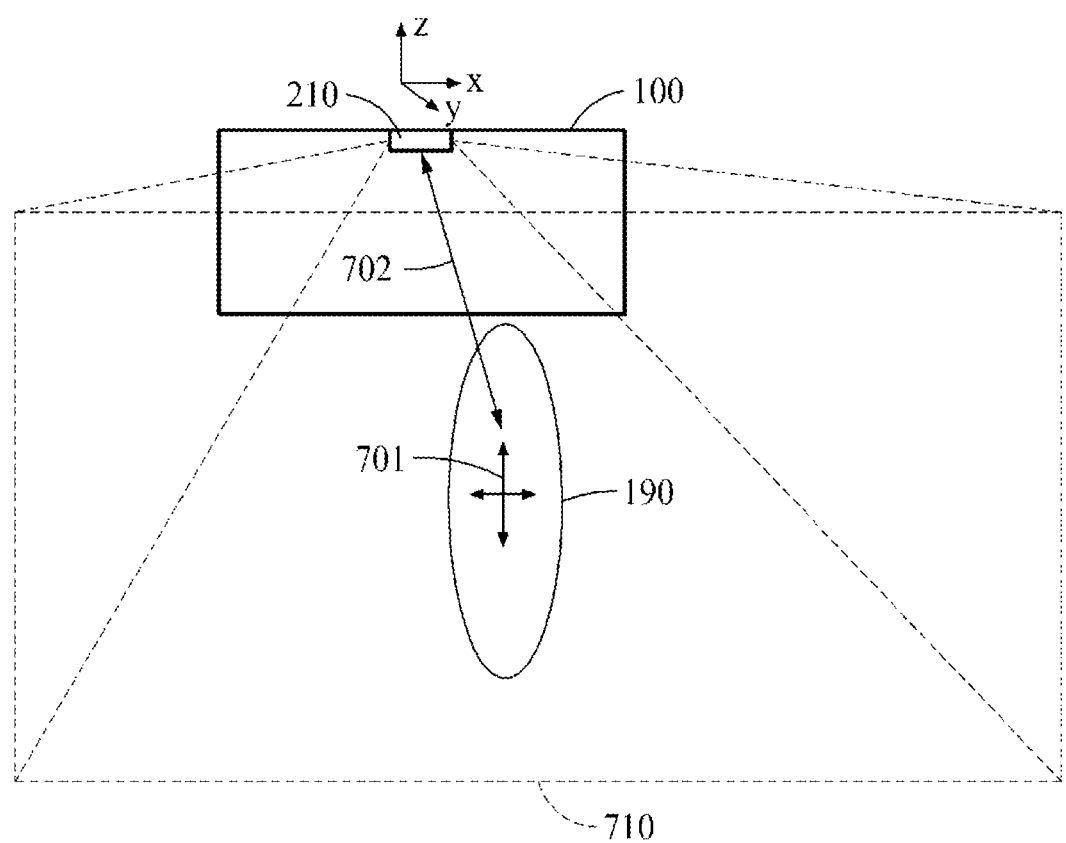
FIG. 7 is a diagram illustrating a distance between an object and a device, and a location of an object with respect to a device, according to an exemplary embodiment.

FIG. 7 is a diagram illustrating a distance between an object and a device, and a location of an object with respect to a device, according to an exemplary embodiment.

Figure 12:
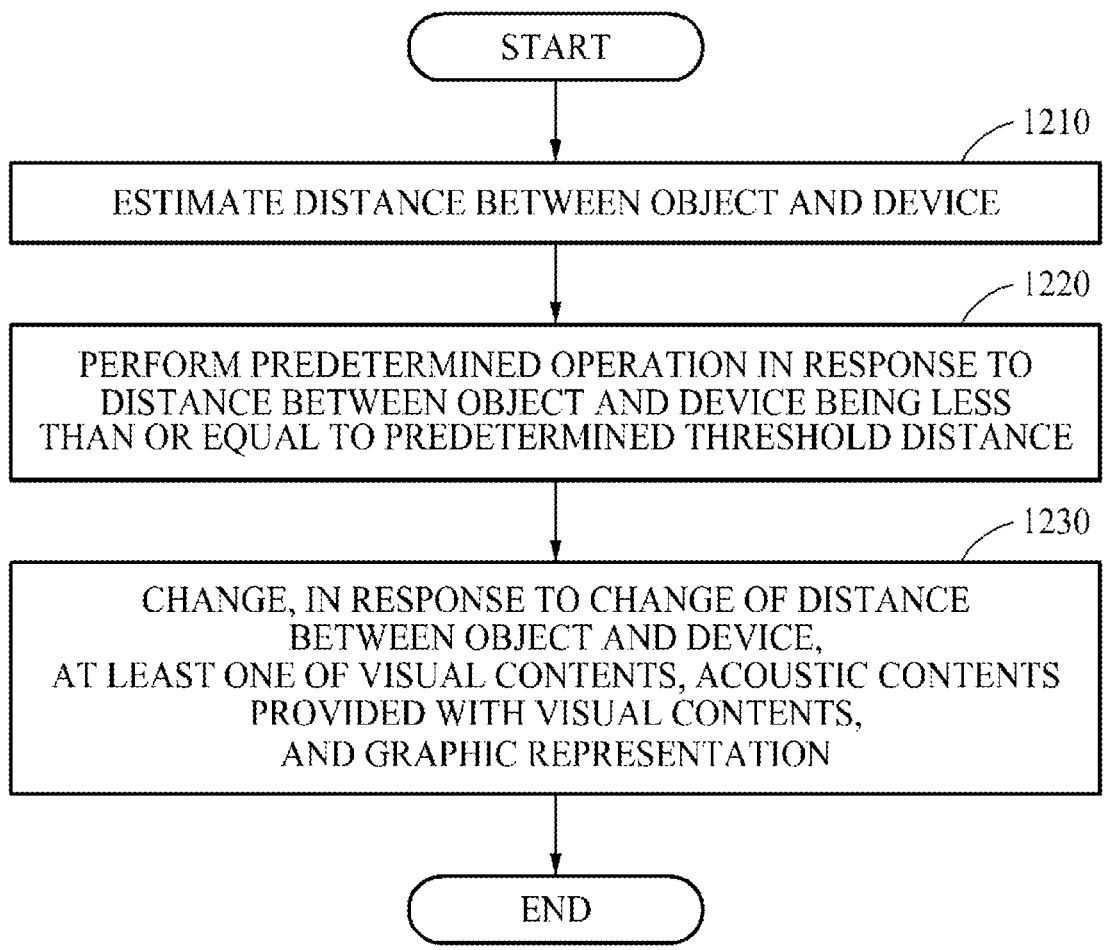
FIGS. 12 and 13 are flowcharts illustrating a method for changing contents based on a distance between an object and a device, according to an exemplary embodiment.

A processor may estimate a location of the object 190 with respect to the device 100 in operation 630 of FIG. 6 and a distance 702 between the device 100 and the object 190 in operation 1210 of FIG. 12.

Although FIG. 7 illustrates that the device 100 includes the event sensor 210 at an upper end thereof, it is only an example. A size, a shape, and a location of the event sensor 210 may be varied based on a design. Dotted lines illustrated in FIG. 7 may be referred to as a sensing space in which the movement of the object 190 is detectable by the event sensor 210.

In the present disclosure, the location of the object 190 with respect to the device 100 may be referred to as a planar location of the object 190 on a sensing plane 710 based on the device 100. For example, a location of the object 190 with respect to the device 100 may indicate, based on the device 100, a location in an x-z plane. The event sensor 210 may detect a planar location movement 701 of the object 190 and use the detected movement to estimate the location of the object 190 with respect to the device 100.

In the present disclosure, the distance 702 between the device 100 and the object 190 may correspond to the distance 702 from the device 100 to the object 190. For example, the distance 702 between the device 100 and the object 190 may correspond to the distance 702 on an x-y plane or a z-y plane. In an example, the event sensor 210 may be provided in a pair, and the processor may estimate the distance 702 from the device 100 to the object 190 by using a pair of event sensors 210. In another example, the device 100 may further include a depth sensor, and the processor may estimate the distance 702 from the device 100 to the object 190 by using the depth sensor. However, the estimating of the distance 702 from the device 100 to the object 190 is not limited to the foregoing. Various forms of sensors and schemes for estimating the distance 702 or a depth may be used.

Figure 8:
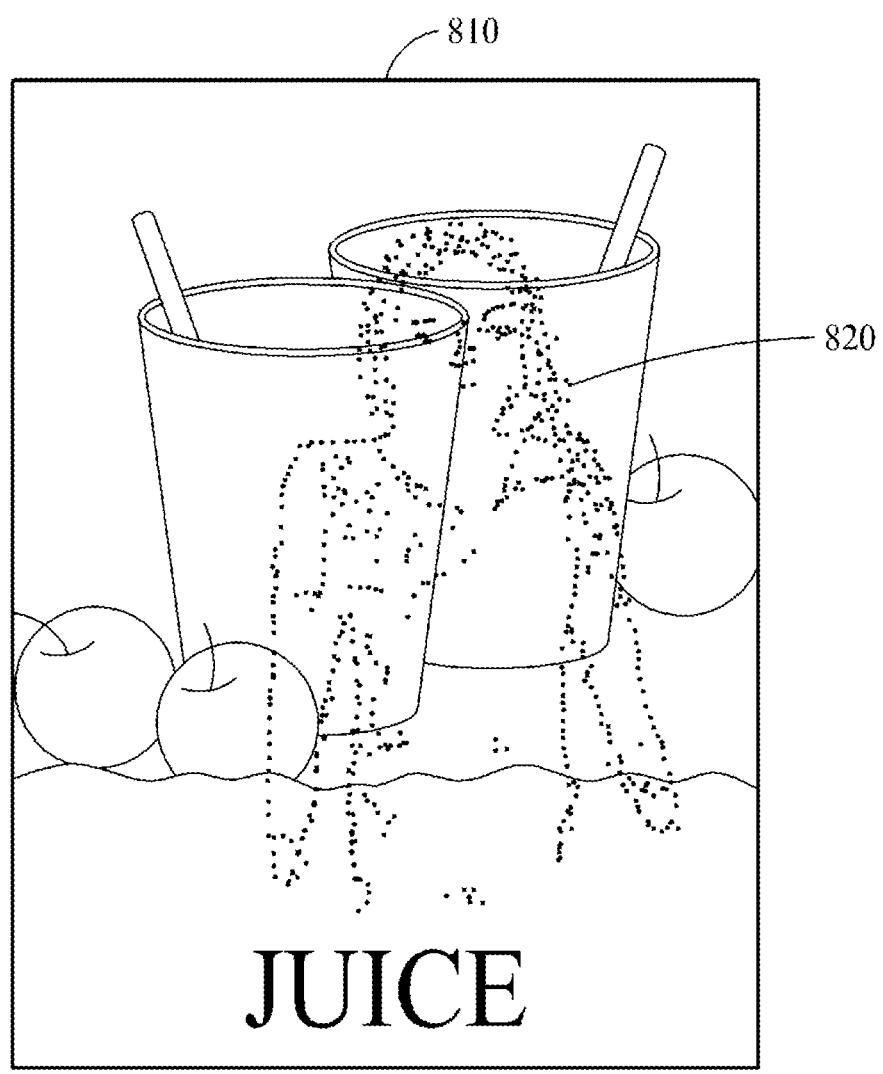
FIG. 8 is a diagram illustrating a graphic representation overlaid on visual contents, according to an exemplary embodiment.

FIG. 8 is a diagram illustrating a graphic representation overlaid on visual contents, according to an exemplary embodiment.

For example, as described above with respect to operation 610, a display may display a background 810 on a screen as visual contents. Further, as described above with respect to operation 620, the display may overlay and display, in response to an output of an event signal, a graphic representation 820 that corresponds to the event signal on the background 810 of FIG. 8 by overlaying the graphic representation 820. For example, the background 810 of FIG. 8 may include a visual advertisement for juice. However, this is only an example. The background 810 may include various forms of contents.

Figure 9:
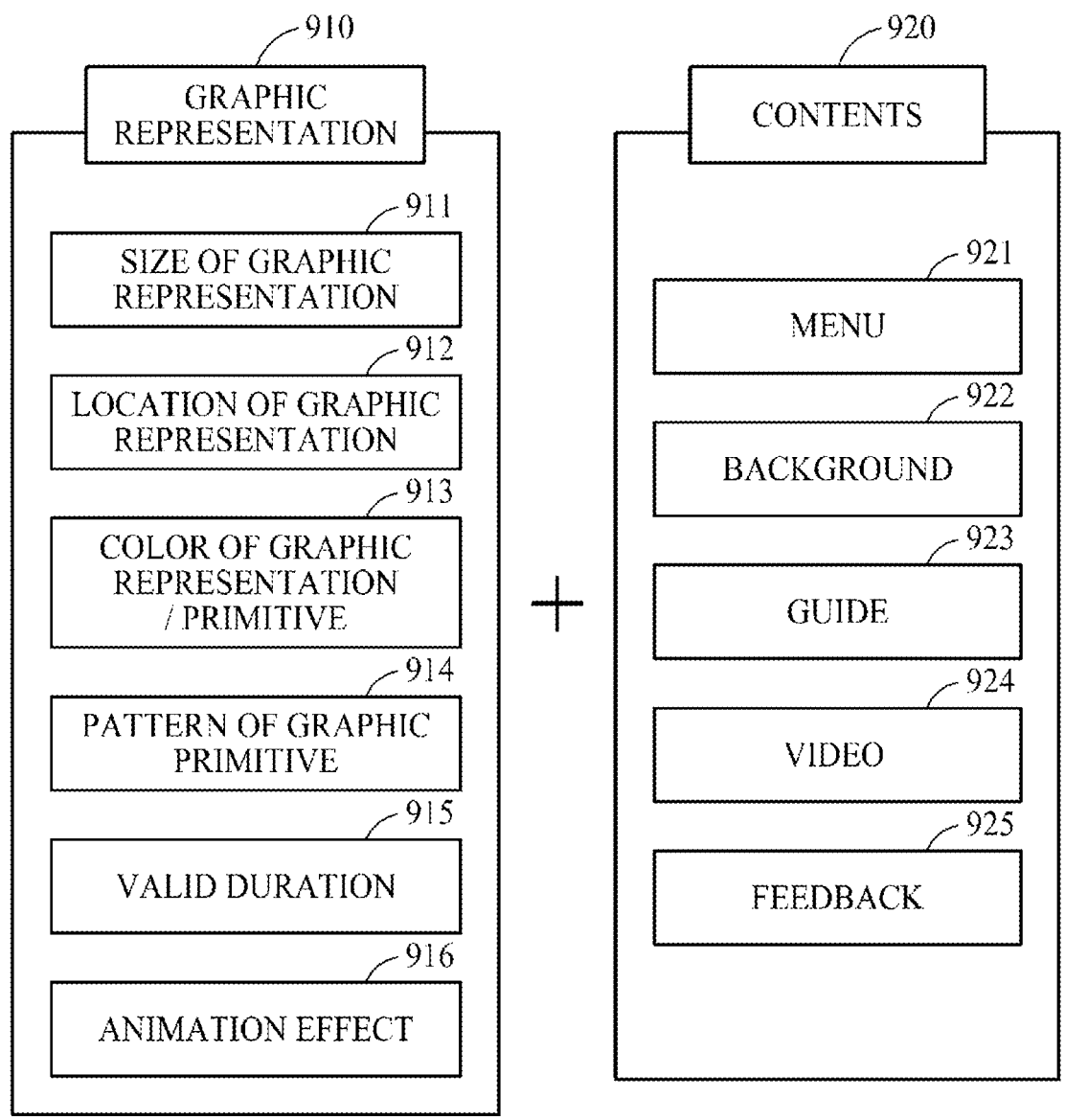
FIG. 9 is a block diagram illustrating examples of forms of contents and settings of a graphic representation, according to an exemplary embodiment.

FIG. 9 is a block diagram illustrating examples of forms of contents and settings of a graphic representation, according to an exemplary embodiment.

A processor may determine a graphic representation 910 to be automatically displayed based on a predetermined reference and/or based on an input received from a user. For example, the processor determines at least one of a size 911 of the graphic representation 910, a location 912 of the graphic representation 910 on a display, a color 913 of at least a portion of the graphic representation 910, a pattern 914 of a graphic primitive included in the graphic representation 910, a valid duration (also referred to herein as a "valid time interval") 915 during which the graphic representation 910 is displayed, and an animation effect 916 to be applied to the graphic representation 910. However, settings of the graphic representation 910 to be determined by the processor are not limited to the foregoing. A number of options set based on a design may be increased or changed.

For example, the size 911 of the graphic representation 910 may be determined based on a resolution of an event sensor and a resolution of a display. In this example, the resolution of the event sensor may correspond to a number of sensing elements included in the event sensor, and the resolution of the display may correspond to a maximum number of pixels that the display may represent. When the resolution of the event sensor is 300×300 and the resolution of the display is 1200×900, the display may display an event signal output under a control of the processor as the graphic representation 910 in a 1:1 ratio or as the graphic representation 910 in an enlarged size or a reduced size. However, this is only an example. A method of determining the size 911 of the graphic representation 910 may be varied based on a design.

For example, the location 912 of the graphic representation 910 on the display may be determined based on an estimated location of an object. For example, when a resolution of an event sensor is less than a resolution of a display, the display may display, under a control of a processor, the graphic representation 910 at a center or an edge of the display. A determination of the location 912 of the graphic representation 910 may be based, for example, on an input received from a user, or changed based on a design.

The color 913 of the graphic representation 910 may be set in advance or determined based on an input received from a user. Further, an entirety of the color 913 of the graphic representation 910 may be an identical color, or alternatively, at least a portion of the color 913 of the graphic representation 910 may include another color. Further, the color 913 of the graphic representation 910 may be determined based on an at least a partial attribute of the object. For example, when an object is a person, a processor may determine that a graphic primitive that corresponds to a hand of a person is a first color, a graphic primitive that corresponds to a torso of a person is a second color, and a graphic primitive that corresponds to a face of a person is a third color. A determination of the color 913 of the graphic representation 910 may be changed based on a design.

The pattern 914 of the graphic primitive included in the graphic representation 910 may be set in advance or determined based on the input received from the user. The pattern 914 of the graphic primitive may correspond to a shape, a size, and a color of a graphic primitive. For example, the pattern 914 of the graphic primitive 910 may include a shape, for example, a circle, a triangle, and a rectangle, and a shape, for example, a particle, a snowflake, and a flower.

The valid duration 915 during which the graphic representation 910 is displayed may indicate a valid time interval defined to display the graphic representation 910. The processor generates, in response to an event signal output during the valid duration 915 with respect to from an earliest output of an event signal from among the plurality of event signals, the graphic representation 910 that corresponds to the event signal output during the valid duration 915, and excludes an event signal that is output after the valid duration 915.

The animation effect 916 to be applied to the graphic representation 910 may be referred to as an additional visual effect to be applied to the graphic representation 910. For example, the processor may apply a first animation effect when the graphic representation 910 is generated, and a second animation effect when the graphic representation 910 is terminated. As an example, the processor may apply a fade-in as the first animation effect and a fade-out as the second animation effect. The first and the second animation effects may be identical, and various forms of effects to generate, change, and remove the graphic representation 910 may be used based on a design.

The contents 920 may include visual contents and acoustic contents. The contents 920 may include any one or more of a menu 921, a background 922, a guide 923, a video 924, and a feedback 925. The contents 920 may be provided for a contents provider for various purposes of providing information, advertisement, and an interest. However, forms of the contents 920 are not limited to the foregoing. The forms of the contents 920 may be added or changed based on a design.

In a case of a gesture recognition-based user interface, an individual may move by directly gazing the movement of the individual through the graphic representation 910. Accordingly, the individual may be provided with the guide 923 with respect to the movement of the individual, thereby enhancing accuracy in the gesture recognition.

The feedback 925 may be referred to as a change of the contents 920 or an addition to the contents 920 provided other than the graphic representation 910 that corresponds to the event signal. For example, when an object is located within a predetermined location, the feedback 925 may be referred to as an operation of changing the contents 920 to be displayed, or an operation of additionally displaying predetermined contents.

Figure 10:
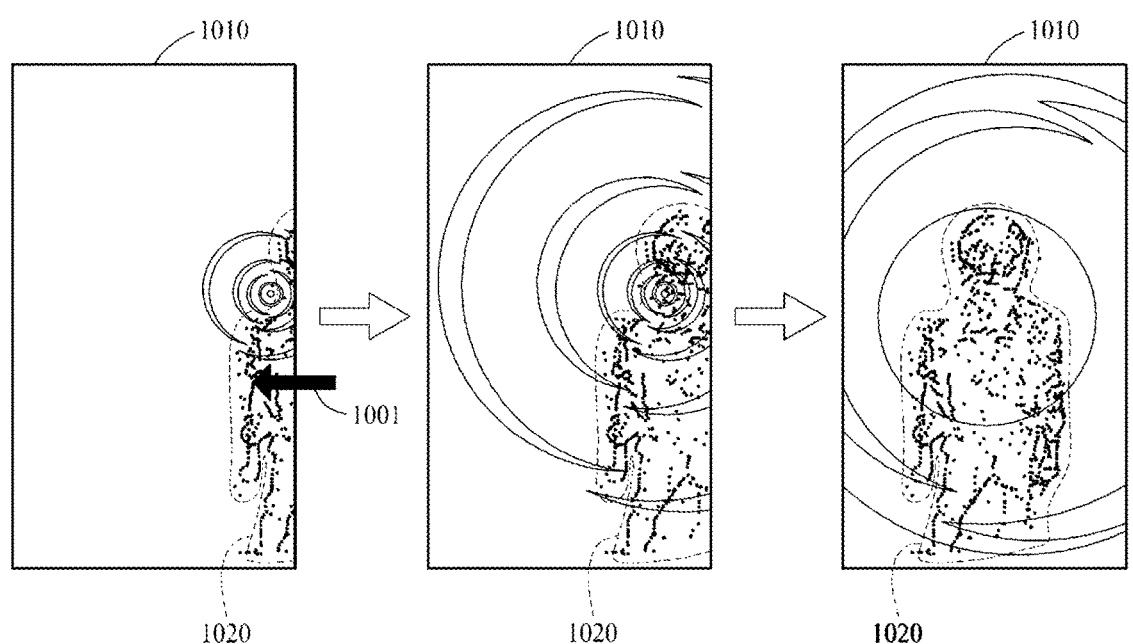
FIGS. 10 and 11 are diagrams illustrating a change of contents in response to a movement of a location of an object, according to an exemplary embodiment.
Figure 11:
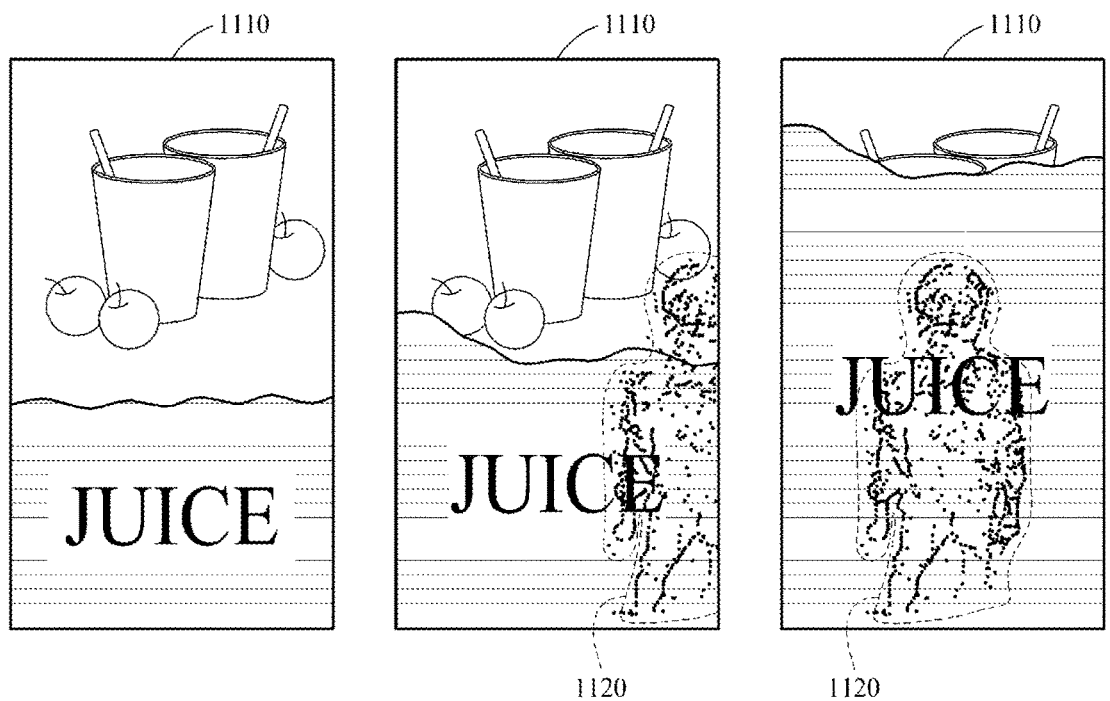

FIGS. 10 and 11 are diagrams illustrating a change of contents in response to a movement of a location of an object, according to an exemplary embodiment Referring to FIG. 10, a case in which a location of an object is moved from an inside to an outside of a sensing space of a device is illustrated. A device according to an exemplary embodiment may detect the object being moved to a first orientation of the sensing space of the device, such as, for example, from an outside to an inside of the sensing space of the device, by using an event sensor. The device may display a graphic representation 1020 that corresponds to an event signal output in response to an event that corresponds to the movement of the object being generated, in order to move to a second orientation 1001, such as, for example, from an outside to an inside of the display. When the location of the object is not in the sensing space, the device may display initial contents, for example, the leftmost image of FIG. 10, in lieu of initiating a display of the graphic representation 1020.

For example, in an exemplary embodiment, circles may be used as a background visual contents to indicate the movement of the object. In particular, as a location at which the graphic representation 1020 is displayed moves from an outside to an inside, the display displays a visual representation in a form of a circle and varies the display thereof by gradually increasing a size of each circle of the background 1010, as illustrated in FIG. 10.

When the object is not in the sensing space according to the movement of the object, a new event is not generated. Accordingly, as an example, a new event signal is not output in the event sensor and the display may terminate the display of the graphic representation 1020. The display may terminate displaying of the graphic representation 1020 in response to a determination that a distance between the object and the device exceeds a threshold distance, or in response to a determination that the object is not in a predetermined space under a control of the processor. The display may terminate displaying of the graphic representation 1020 and display the initial contents, for example, the leftmost image of FIG. 10, which are not changed previously.

FIG. 11 also illustrates a case in which a location of an object is moved from an inside to an outside of a sensing space of a device. The display of the device according to an exemplary embodiment may variably display a visual representation, as illustrated in FIG. 11, in a form of water in a background 1110 such that a water level appears to gradually increase when a location at which a graphic representation 1120 being displayed is moved from an outside to an inside.

A visual application effect that differs from a graphic representation may be used. For example, the processor may change background contents based on a size or a location of a graphic representation, or control a display so that effects such as a wave and a particle, for example, an afterimage effect, are present adjacent to the graphic representation when a whole or a portion of a graphic representation of a body, for example, a hand, moves.

However, the changing of the contents is not limited to the foregoing. The processor may perform, based on a design, operations of controlling a display to terminate a display the contents, changing the contents in various methods in response to the movement of the location of the object, and generating additional contents.

For example, when an object is not in a sensing space, an event may not be generated. Accordingly, in this example, a new event signal is not output in an event sensor and a display may terminate displaying of the graphic representation 1120. The display may terminate displaying of the graphic representation 1120 in response to a determination that a distance between the object and the device exceeds a threshold distance or in response to a determination that the object is not in a predetermined space under a control of the processor. The display may terminate displaying of the graphic representation 1120 and display initial contents, for example, a leftmost image of FIG. 11, which are not changed previously.

Figure 13:
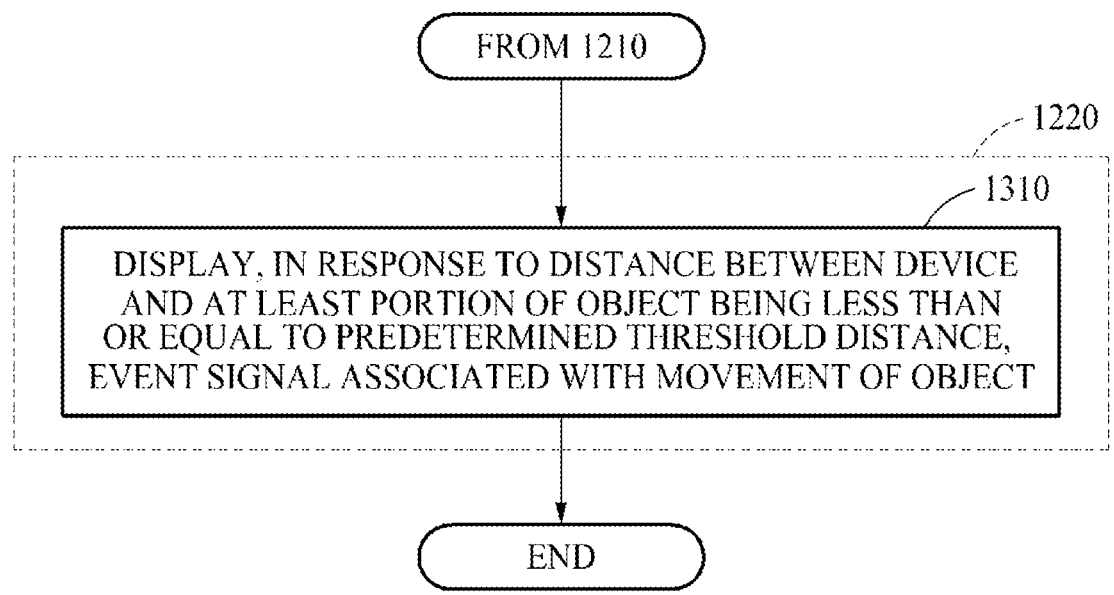

FIGS. 12 and 13 are flowchart illustrating a method for changing contents based on a distance between an object and a device, according to an exemplary embodiment.

FIG. 12 is a flowchart illustrating a method for changing, in response to a change of a distance between an object and a device, at least one of visual contents, acoustic contents, and a graphic representation.

In operation 1210, a processor estimates the distance between the object and the device. For example, a device may include a pair of event sensors, and a processor may estimate a distance between an object and a device by using a respective pair of event signals output from the pair of event sensors. In another example, a device may include a depth sensor, and a processor may estimate a distance between an object and a device by using a depth signal output from the depth sensor. The device may include various types of sensors to measure a distance or a depth, and the processor may estimate a distance by using a signal output from the sensor.

In operation 1220, the processor performs a predetermined operation in response to the estimated distance between the object and the device being less than or equal to a predetermined threshold distance. The predetermined threshold distance may be set by a user or set in advance. For example, a threshold distance may be set based on an assumption of a maximum distance from which an individual gazes at the device. For example, a predetermined operation may include changing, generating, and removing contents and a graphic representation. The processor may control, in response to a determination that the distance between the object and the device is less than or equal to the predetermined threshold distance, a display to display a graphic representation that is responsive to an event signal, as the predetermined operation.

In operation 1230, the processor changes, in response to the change of the distance between the object and the device, at least one of the visual contents, the acoustic contents provided with the visual contents, and the graphic representation. For example, the closer an estimated distance between an object and a device, the greater a size of visual contents and a graphic representation generated by a processor, and the greater a volume of acoustic contents generated by the processor. Further, the closer the estimated distance between the object and the device, the relatively darker or sharper the graphic representation generated by the processor. In particular, the processor may generate the graphic representation when an individual is determined (i.e., estimated) as being located within a predetermined distance, and also remove the graphic representation when the individual is determined to be distant or to have departed from a proximal location in front of the display.

The device according to an exemplary embodiment may be used in digital signage displayed in public places such as a department store, a hotel, a hospital, and a street, such as, for example, a display window. For example, when a predetermined individual approaches a location at which a number of people pass by to gaze at a signage, a graphic representation is overlaid on contents being displayed on a display, thereby gaining an interest of the individual.

In contrast to a conventional signage that only provides information, when the device described above is applied to the signage, two-way communication may be provided in a form of a graphic representation according to whether an individual gazes the signage. Further, an inductive effect of interest with respect to the device according to an exemplary embodiment may be maximized by combining the two-way communication and one-way communication to reflect contents that may induce an interest of a user by analyzing gender and age information, and by outputting a predetermined sound effect, for example, a greeting or salutation, when the individual passes in front of signage.

A service access frequency and time may increase by inducing the interest of the individual by using a visual effect that is varied according to a time, distance, and a movement, in addition to whether the individual is present. Further, by using an event sensor of which a delay time is relatively small, a real-time feedback without a delay may be available.

FIG. 13 is a flowchart illustrating an exemplary method of operation 1220.

In operation 1310, the display may display the event signal associated with the movement of the object, in response to a determination that the distance between at least a portion of the object and the device is less than or equal to the predetermined threshold distance. For example, the processor may generate, in response to a determination that a distance between at least a portion of an object and a device, for example, a portion of a body, is less than or equal to a threshold distance, a graphic representation that corresponds to an event signal associated with a movement of the object, and a display may display the generated graphic representation.

Figure 14:
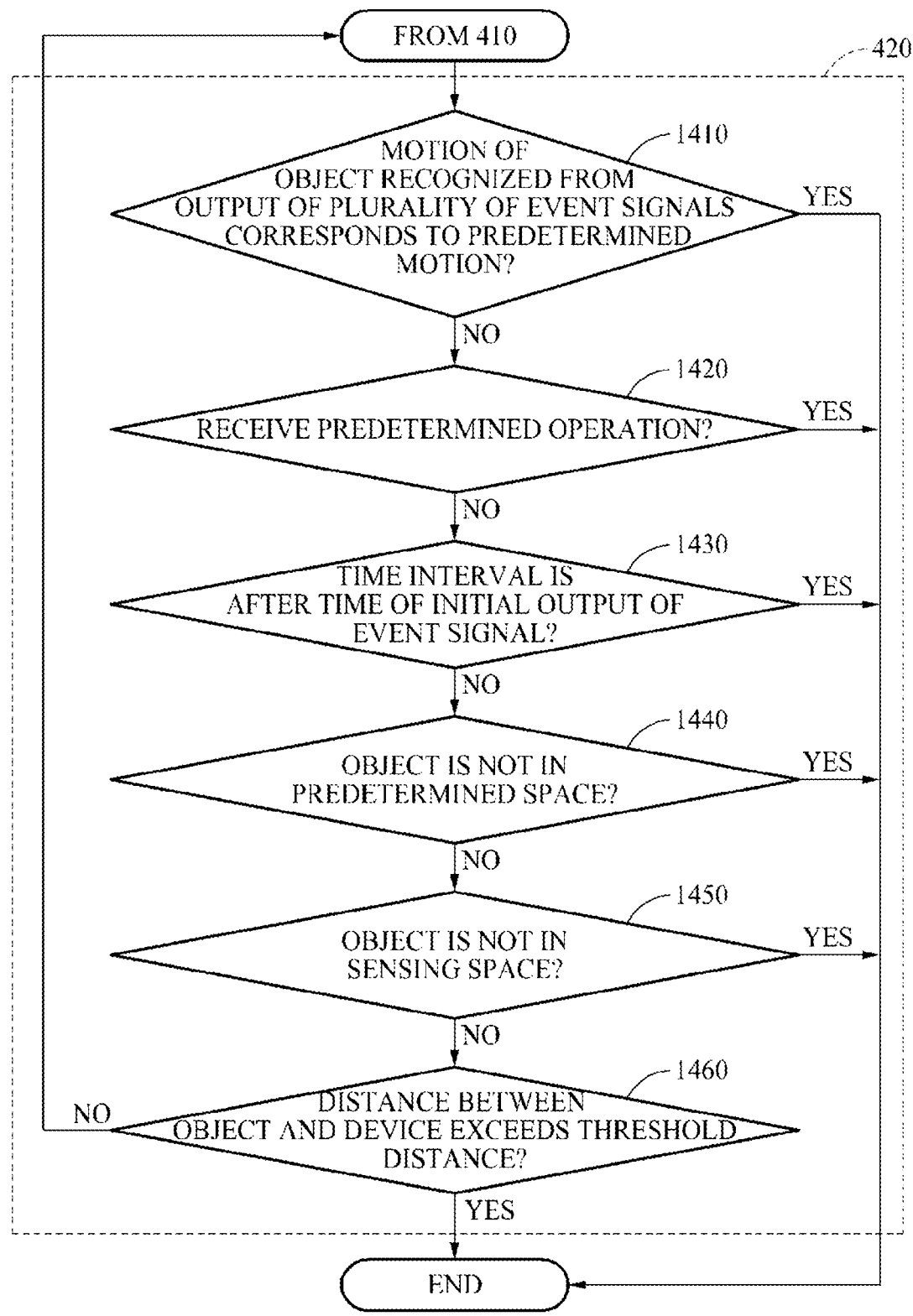
FIG. 14 is a flowchart illustrating a method of terminating a display of a graphic representation, according to an exemplary embodiment.

FIG. 14 is a flowchart illustrating a method for terminating a display of a graphic representation, according to an exemplary embodiment.

The method for terminating a display of the graphic representation in operation 420 of FIG. 4 may be described as an example below.

In operation 1410, the processor determines whether a motion of an object recognized from an output of a plurality of event signals corresponds to a predetermined motion. The display terminates displaying of the graphic representation in response to a determination that the motion of the object recognized under a control of the processor corresponds to the predetermined motion. For example, when an object is a person, the predetermined motion may include each of a plurality of motions, such as, for example, shaking a hand, nodding a head, and swaying an arm, that may terminate displaying of a graphic representation.

In operation 1420, the processor determines whether a predetermined operation is received from a user. For example, the display may terminate displaying of a graphic representation in response to a reception of the predetermined operation under the control of the processor. The predetermined operation may include entire operations or inputs received via an input receiver that may terminate displaying of the graphic representation.

In operation 1430, the processor determines whether a current time elapses during a valid time interval with respect to a time of an initial output of an event signal. For example, a processor excludes an event signal output after a valid time interval.

In operation 1440, the processor determines whether the object is not in the predetermined space. For example, a display may display a graphic representation only when a determination is made that an object is within a predetermined space, and may terminate displaying of the graphic representation when the object is determined as not being in the predetermined space.

In operation 1450, the processor determines whether the object is not in a sensing space. For example, a display may display a graphic representation only when a determination is made that an object is in a sensing space, and may terminate displaying of the graphic representation when the object is determined as not being in the sensing space.

In operation 1460, the processor determines whether a distance between the object and the device exceeds a threshold distance. For example, a display may terminate displaying of a graphic representation when a determination is made that a distance between an object and a device exceeds a threshold distance. In addition, when a determination is made that the distance between the object and the device does not exceed the threshold distance, the processor may return to operation 410 and generate, in response to an event signal output during a valid time interval with respect to a time of an initial output of an event signal among the plurality of event signals, a graphic representation that corresponds to the event signal output during the valid time interval.

Figure 15:
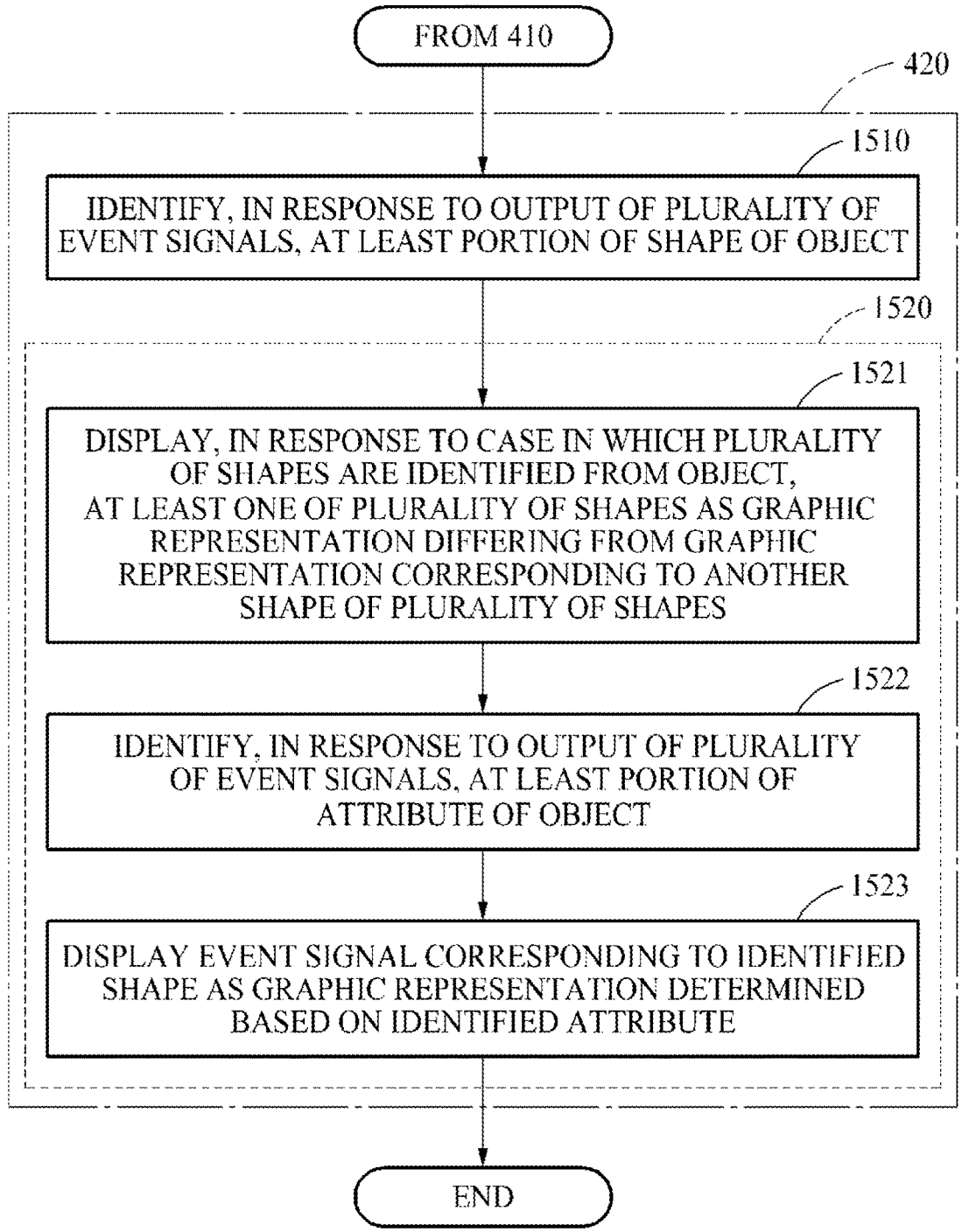
FIG. 15 is a flowchart illustrating a method for displaying, in response to an output of a plurality of event signals, a graphic representation by identifying an attribute and a shape of an object, according to an exemplary embodiment.

FIG. 15 is a flowchart illustrating a method for displaying, in response to an output of a plurality of event signals, a graphic representation by identifying an attribute and a shape of an object, according to an exemplary embodiment.

FIG. 15 is a flowchart illustrating another exemplary method for displaying the graphic representation in operation 420 of FIG. 4.

In operation 1510, the processor identifies, in response to the output of the plurality of event signals, at least a portion of a shape of the object. For example, when an object is a person, a processor may identify a portion of a body, for example, a face, an arm, and a torso, of the person. The processor may identify a shape stored in database based on a design. For example, when an object is an animal, a processor may identify shapes of a dog and a cat, and a shape of a finger which is a portion of a hand of a person.

In operation 1520, the display may display an event signal that corresponds to the identified shape as the graphic representation. For example, the display may display graphic representations that correspond to the identified shapes in operations 1521, 1522, and 1523.

For example, in operation 1521, the display may display, in response to a case in which a plurality of shapes are identified with respect to the object, at least one of the plurality of shapes as a graphic representation that differs from a graphic representation that corresponds to another shape of the plurality of shapes. For example, a display may display a hand of a person in a first color and a face of a person in a second color. The processor may generate an identical graphic representation even when a plurality of shapes is identified. Further, the processor may generate a graphic representation as another graphic representation by differentiating a size, a color, and a pattern of a graphic primitive.

In operation 1522, the processor identifies, in response to the output of the plurality of event signals, at least a portion of an attribute of the object. The at least a portion of the attribute is a reference that is used to classify at least a portion of an object, for example, a speed and a shape of a hand, a face, an arm, and/or a leg of an object. For example, a processor may estimate, in response to an output of a plurality of event signals, a speed of at least a portion of an object and identify, as an attribute, a first portion moving at a first speed, for example, a speed faster than a reference speed, and a second portion moving at a second speed, for example, a speed slower than the reference speed. For example, a speed of at least a portion of an object may be determined based on a difference in time information in which an event signal is output in sensing elements adjacent to each other. Various schemes, for example, optical flow estimation, for estimating a speed of an object by using an event signal may be used.

In operation 1523, the display may display the event signal that corresponds to the identified shape as a graphic representation determined based on the identified attribute. For example, a display may display a first portion moving at a first speed as a graphic representation in a first color and a second portion moving at a second speed as a graphic representation in a second color. In particular, the processor may also determine a size, a color, and a pattern of a graphic primitive of a graphic representation based on the identified attribute.

Figure 16:
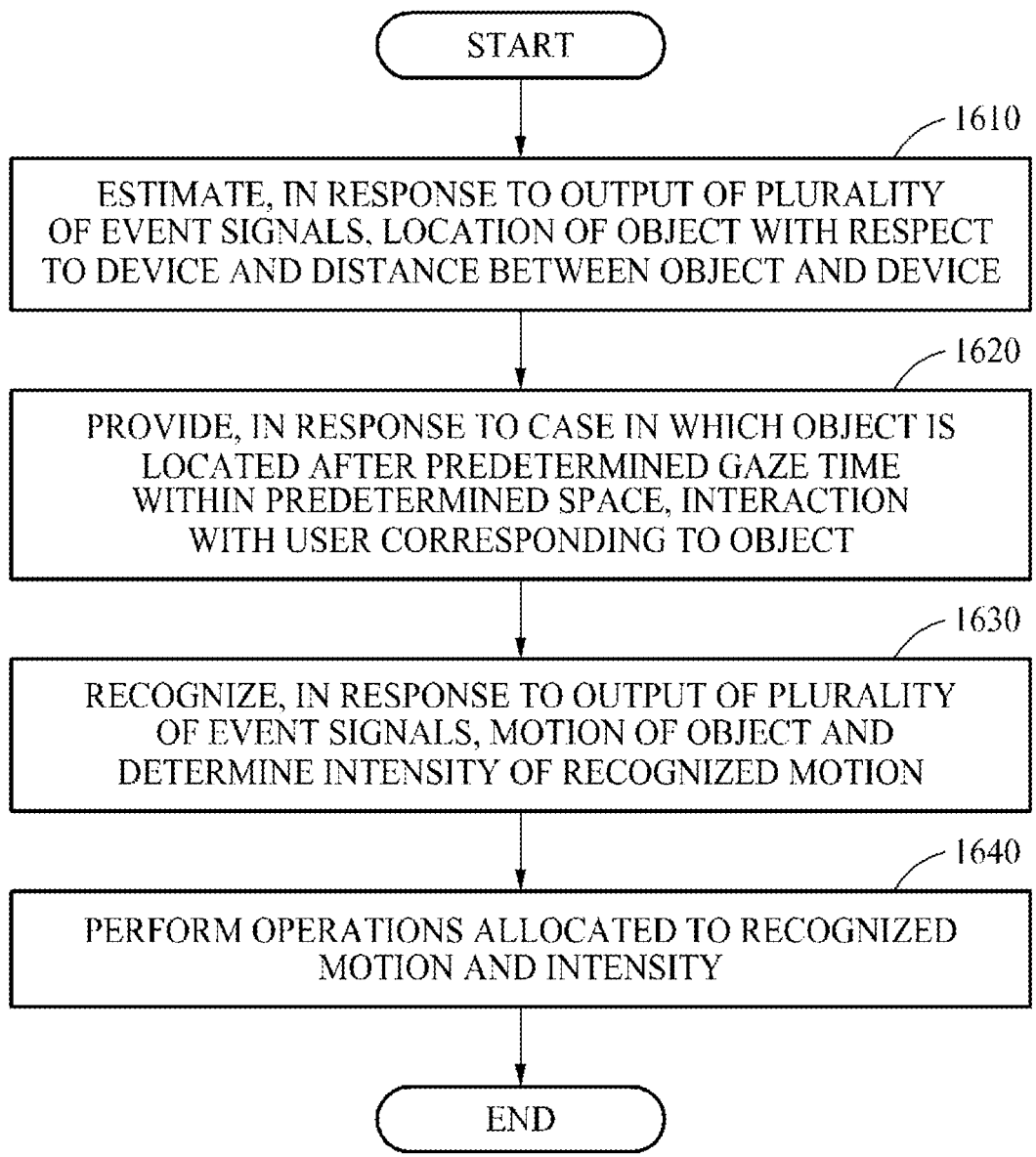
FIG. 16 is a flowchart illustrating a method for providing an interaction based on a distance between an object and a device and performing an operation that corresponds to recognizing a motion, according to an exemplary embodiment.

FIG. 16 is a flowchart illustrating a method for providing an interaction based on a distance between an object and a device and performing an operation that corresponds to recognizing a motion, according to an exemplary embodiment.

In operation 1610, a processor estimates, in response to an output of a plurality of event signals, a location of an object with respect to a device and a distance between the object and the device. The location of the object may be estimated based on a method similar to operation 630 of FIG. 6, and the distance between the object and the device may be estimated based on a method similar to operation 1210 of FIG. 12.

In operation 1620, the processor provides, in response to a determination that the object is located within a predetermined space after a predetermined gazing time, an interaction with a user that corresponds to the object. The predetermined space may be set as a space within a range at which an individual gazes at a device, based on a design. For example, the predetermined space may be set as a space that has a volume in which a predetermined region, for example, a region in an x-y plane as illustrated in FIG. 7, corresponds to a center of a display being expanded by a predetermined distance, such as, for example, expanding according to an y-axis as illustrated in FIG. 7. The gazing time may be set, based on a design, as a time in which an individual is expected to gaze at a device. The interaction is a feedback provided for an individual by a device in response to an output of an event signal associated with a movement of an object and an input from the individual. For example, the interaction may include operations of changing and providing any one or more of a guide, a video, and a menu for providing information, an advertisement, and an interest for the individual. When the individual stands during a predetermined time, a graphic representation may be continuously changing or may disappear.

In operation 1630, in response to the output of the plurality of event signals, the processor recognizes a motion of the object and determines an intensity of the recognized motion. The processor may recognize a motion stored in a database. For example, a motion may include a gesture that corresponds to an object moving according to a predetermined trajectory, a gesture of repeating a movement in the predetermined trajectory, and a gesture of changing a shape of the object. For example, the intensity of the motion may include any of a size of a trajectory in which the motion passes, a number of times the motion is repeated, and a duration of the motion. For example, a motion may include any of a gesture of touching a screen, indicating contents, and shaking a hand.

In operation 1640, the processor performs operations that correspond to the recognized motion and the intensity. The processor may perform, with respect to the recognized motion and the intensity, operations allocated by a user or operations of the device allocated in advance. For example, the processor may change a color or a shape of a graphic representation and intensity in brightness. The processor may also change a graphic representation that corresponds to at least a portion, for example, a predetermined portion such as a hand, of an object to be highlighted.

Figure 17:
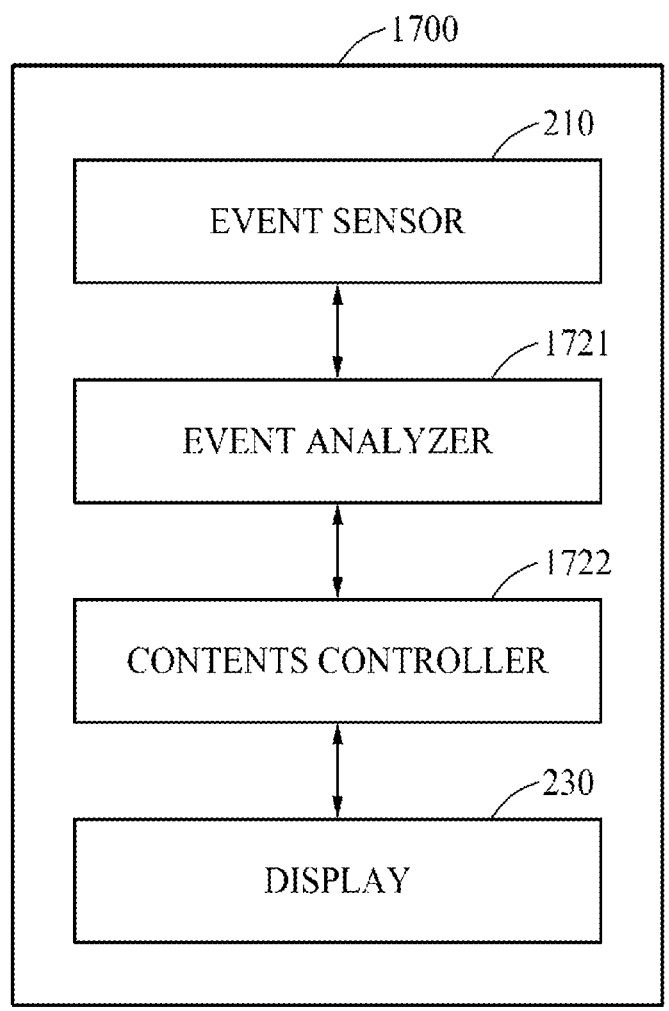
FIG. 17 is a block diagram illustrating a device for displaying a screen based on an event, according to another exemplary embodiment.

FIG. 17 is a block diagram illustrating a device 1700 for displaying a screen based on an event, according to another exemplary embodiment.

Referring to FIG. 17, the device 1700 for displaying a screen based on an event includes the event sensor 210, an event analyzer 1721, a contents controller 1722, and the display 230. The event sensor 210 and the display 230 may be operated as described above with respect to FIG. 2.

The event analyzer 1721 may analyze an event generated based on the event signal output from the event sensor 210. For example, the event analyzer 1721 may estimate a distance between an object and the device 1700, identify a portion of body or a face from the event signal, recognize a motion and an intensity, and estimate a location of the object. For example, the event analyzer 1721 may analyze an event signal based on a method similar to methods described above with respect to FIGS. 4 through 16.

The contents controller 1722 may control a display of contents based on the analyzed event signal. For example, the contents controller 1722 may control a display to display contents and generate, change, and remove the contents in response to an output of the event signal. The contents controller 1722 may control the display of the contents based on a method similar to the methods described above with respect to FIGS. 4 through 16.

Figure 18:
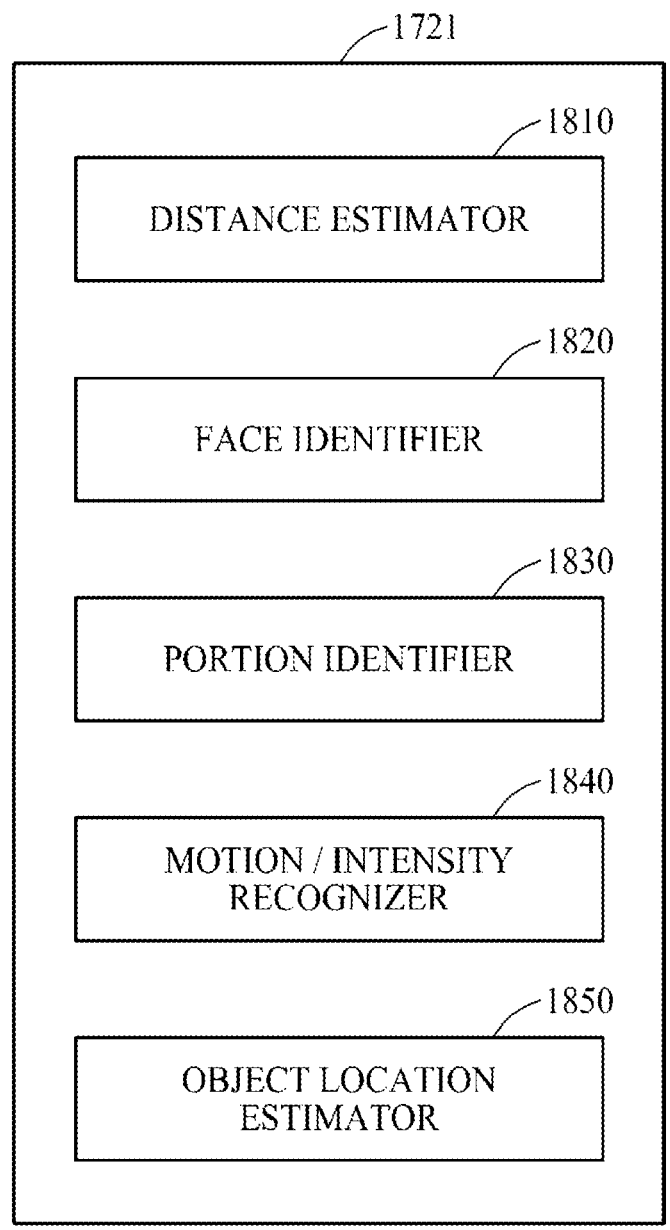
FIG. 18 is a block diagram illustrating a detailed configuration of an event analyzer, according to an exemplary embodiment.

FIG. 18 is a block diagram illustrating a detailed configuration of an event analyzer, according to an exemplary embodiment.

The event analyzer 1721 includes a distance estimator 1810, a face identifier 1820, a portion identifier 1830, a motion/intensity recognizer 1840, and an object location estimator 1850.

The distance estimator 1810 may estimate a distance between an object and a device. For example, the distance estimator 1810 may estimate a distance based on a scheme similar to operation 1210 of FIG. 12.

When an object is a person, the face identifier 1820 may identify a face of a person. For example, the identifier 1820 may identify a face by applying a face recognition algorithm to event signals that have been output. Based on a design, various face recognition algorithms such as a neural network and a hidden Markov model (HMM) may be applied.

The portion identifier 1830 may identify at least a portion of a shape of the object. For example, the portion identifier 1830 may identify a portion of a shape of an object by using a recognition algorithm for recognizing a predetermined portion. Based on a design, the various face recognition algorithms such as the neural network and the hidden Markov model (HMM) may be applied.

The motion/intensity recognizer 1840 may recognize a motion and an intensity of the motion. For example, the motion/intensity recognizer 1840 may recognize a motion and an intensity of the motion based on a scheme similar to operation 1640 of FIG. 16.

The object location estimator 1850 may estimate a planar location of the object with respect to the device. For example, the object location estimator 1850 may estimate a location of an object based on a scheme similar to operation 630 of FIG. 6.

The units described herein may be implemented by using hardware components, software components, or a combination thereof. For example, a processing device may be implemented by using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, a person of skill in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media that include program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as compact disc-read-only memory (CD-ROM) discs and digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer by using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those of skill in the art that changes may be made to these exemplary embodiments without departing from the principles and spirit of the present disclosure, the scope of which is defined by the claims and their equivalents.

What is claimed is:

1. A device for displaying a screen based on an event, the device comprising:
    a display;
    an event-based vision sensor comprising a plurality of sensing elements, each of the plurality of sensing elements being configured to detect a brightness-changing event and to output a corresponding event signal from among a plurality of event signals generated by sensing elements to detect the brightness-changing event; and
    a processor configured to control the display to display visual contents, determine a distance between the device and at least a portion of an object, generate, based on the plurality of event signals and the distance being less than a predetermined threshold distance, a graphic representation comprising a plurality of graphic primitives that correspond to at least one from among the plurality of event signals that relates to a movement of the object, and control the display to, based on the distance being less than the predetermined threshold distance, display the graphic representation by overlaying the graphic representation over the visual contents, wherein each of the plurality of event signals includes respective time information and a first address of a corresponding sensing element, and wherein the time information and the first address are generated by the processor, based on asynchronous detection of the brightness-changing event.

2. The device of claim 1, wherein the processor is further configured to determine the graphic representation to be overlaid transparently or translucently with respect to the visual contents.

3. The device of claim 2, wherein the processor is further configured to estimate, based on the plurality of event signals, a location of the object, and to change, based on the movement of the object, at least one from among the visual contents and acoustic contents provided with the visual contents.

4. The device of claim 1, wherein the processor is further configured to execute, based on the distance between the object and the device being determined to be less than or equal to the predetermined threshold distance, a predetermined operation.

5. The device of claim 1, wherein the display is further configured to display, based on the distance between at least the portion of the object and the device being determined to be less than or equal to the predetermined threshold distance, event signals from among the plurality of event signals that relate to the movement of the object.

6. The device of claim 1, wherein the processor is further configured to determine at least one from among a size of the graphic representation, a location of the graphic representation on the display, a color of at least a part of the graphic representation, a pattern of the plurality of graphic primitives included in the graphic representation, a valid time interval during which the graphic representation is displayed, and an animation effect applied to the graphic representation.

7. The device of claim 6, wherein the processor is further configured to determine, based on an input received from a user, at least one from among the size of the graphic representation, the location of the graphic representation on the display, the color of at least the portion of the graphic representation, the pattern of the plurality of graphic primitives included in the graphic representation, the valid time interval during which the graphic representation is displayed, and the animation effect applied to the graphic representation.

8. The device of claim 1, wherein the display is further configured to asynchronously display, based on the at least one from among the plurality of event signals that relates to the movement of the object, the plurality of graphic primitives.

9. The device of claim 1, wherein the processor is further configured to accumulate the at least one from among the plurality of event signals that relates to the movement of the object during a predetermined time interval and to generate a cumulative graphic representation based on the accumulating.

10. The device of claim 1, wherein the display is configured to terminate the displaying of the graphic representation based on at least one from among a first determination that a motion of the object recognized from the output of the plurality of event signals corresponds to a predetermined motion, a reception of a predetermined manipulation, a second determination that the object is not in a predetermined space, a third determination that the object is not in a sensing space, and a fourth determination that the distance between the object and the device exceeds the predetermined threshold distance.

11. The device of claim 1, wherein the processor is further configured to generate, based on a first event signal from among the plurality of event signals during a valid time interval with respect to a time of an earliest output of an event signal from among the plurality of event signals, a first graphic representation that corresponds to the first event signal, and to exclude a second event signal from among the plurality of event signals that is outputted after the valid time interval.

12. The device of claim 1, wherein the processor is further configured to identify, based on the plurality of event signals, a shape of at least the portion of the object, and wherein the display is further configured to display a first event signal from among the plurality of event signals that corresponds to the shape identified by the processor as the graphic representation.

13. The device of claim 1, wherein the processor is further configured to identify, based on the plurality of event signals, at least one shape of at least the portion of the object, and wherein when the at least one shape includes a plurality of shapes, the display is further configured to display at least a first shape from among the plurality of shapes as a first graphic representation that corresponds to the at least the first shape, that differs from a second graphic representation that corresponds to a second shape from among the plurality of shapes.

14. The device of claim 1, wherein the processor is further configured to identify, based on the plurality of event signals, an attribute and a shape of at least the portion of the object, and wherein the display is further configured to display a first event signal from among the plurality of event signals that corresponds to the shape identified by the processor as a first graphic representation determined based on the attribute identified by the processor.

15. The device of claim 1, wherein the processor is further configured to estimate, based on the plurality of event signals, the distance from the device to the object and a location of the object with respect to the device, and to provide, based on a determination of the location of the object after a predetermined gaze time within a predetermined space, an interaction with a user that corresponds to the object.

16. The device of claim 1, wherein the processor is further configured to recognize, based on the plurality of event signals, a motion of the object, to determine an intensity of the motion recognized by the processor, and to perform at least one operation that corresponds to the motion and the intensity.

17. The device of claim 1, wherein the processor is further configured to determine, based on a second address that corresponds to the at least one from among the plurality of event signals that relates to the movement of the object, a location within the display at which the graphic representation is displayed.

18. The device of claim 1, wherein the processor is further configured to estimate the distance from the device to the object and to change, based on a change of location of the object, at least one from among a plurality of visual contents, acoustic contents provided with the at least one from among the plurality of visual contents, and the graphic representation.

19. A method for displaying a screen on a device based on an event, the method comprising:

displaying a visual content;

detecting a plurality of events, each of the plurality of events being detected by a corresponding sensing element from among a plurality of sensing elements included in an event-based vision sensor;

outputting a plurality of event signals, each event signal from among the plurality of event signals corresponding to a brightness-changing event from among the plurality of events;

determining a distance between the device and at least a portion of an object;

generating, based on the plurality of event signals and the distance being less than a predetermined threshold distance, a graphic representation comprising a plurality of graphic primitives that correspond to at least one from among the plurality of event signals that relates to a movement of the object; and displaying, based on the distance being less than the predetermined threshold distance, the graphic representation by overlaying the graphic representation over the visual content, wherein each of the plurality of event signals includes respective time information and an address of the corresponding sensing element, and wherein the time information and the address are generated by a processor, based on asynchronous detection of the brightness-changing event.

20. A non-transitory computer-readable recording medium that stores a program that is executable by a computer to perform a method for displaying a screen on a device based on an event, the method including:

displaying a visual content;

detecting a plurality of events, each of the plurality of events being detected by a corresponding sensing element from among a plurality of sensing elements included in an event-based vision sensor;

outputting a plurality of event signals, each event signal from among the plurality of event signals corresponding to a brightness-changing event from among the plurality of events;

determining a distance between the device and at least a portion of an object;

generating, based on the plurality of event signals and the distance being less than a predetermined threshold distance, a graphic representation comprising a plurality of graphic primitives that correspond to at least one from among the plurality of event signals that relates to a movement of the object; and displaying, based on the distance being less than the predetermined threshold distance, the graphic representation by overlaying the graphic representation over the visual content, wherein each of the plurality of event signals includes respective time information and an address of the corresponding sensing element, and wherein the time information and the address are generated by a processor, based on asynchronous detection of the brightness-changing event.

* * * * *